United States Patent [19]
Daniels

[11] Patent Number: 5,431,813
[45] Date of Patent: Jul. 11, 1995

[54] WATER FILTERING BOTTLE

[76] Inventor: Jack E. Daniels, 13567 Candlewood Ct., Moorpark, Calif. 93021

[21] Appl. No.: 194,878

[22] Filed: Feb. 14, 1994

[51] Int. Cl.⁶ .............................................. B01D 24/02
[52] U.S. Cl. .................................... 210/282; 210/286; 210/477; 210/472
[58] Field of Search ............... 210/282, 264, 266, 285, 210/286, 290, 474, 472, 475, 466, 502.1, 477; 222/189

[56] References Cited

U.S. PATENT DOCUMENTS

| | | | |
|---|---|---|---|
| 2,389,185 | 11/1945 | Dick | 222/189 |
| 3,220,555 | 11/1965 | Silha | 210/282 |
| 3,335,917 | 8/1967 | Knight | 222/189 |
| 3,926,348 | 12/1975 | Lutzker | 222/189 |
| 4,695,379 | 9/1987 | Nohren, Jr. et al. | 210/282 |
| 4,938,389 | 7/1990 | Rossi et al. | 210/321.64 |
| 5,076,922 | 12/1991 | Deare | 210/282 |
| 5,122,272 | 6/1992 | Iana et al. | 210/282 |
| 5,265,770 | 11/1993 | Matkovich et al. | 222/189 |

*Primary Examiner*—Robert A. Dawson
*Assistant Examiner*—Robert James Popovics
*Attorney, Agent, or Firm*—Jack E. Munro

[57] ABSTRACT

A water filtering bottle which includes a water filtering apparatus incorporated within the neck of the bottle. During normal consumption of the water from the water filtering bottle, water is filtered by the water filtering apparatus to remove unwanted substances in the water such as pesticides, chlorine, particulate matter, algae, bacteria, heavy metals, and improves odor and flavor of the consumable water.

9 Claims, 1 Drawing Sheet

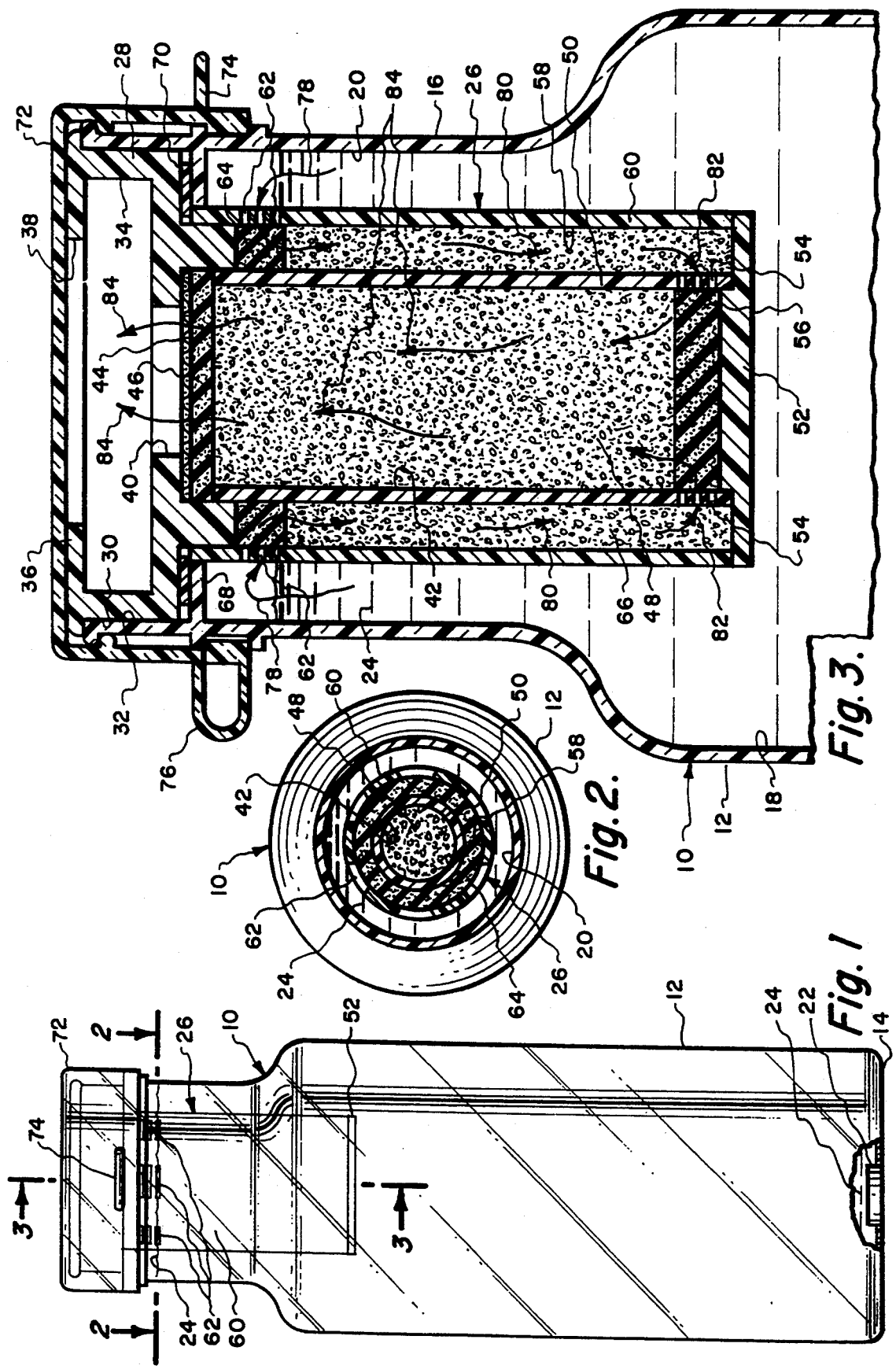

WATER FILTERING BOTTLE

BACKGROUND OF THE INVENTION

1) Field of the Invention

The field of this invention relates to water filtering devices and more particularly to a hand held water bottle which includes a water filter apparatus which filters the water as it is consumed.

2) Description of the Prior Art

Water filtering apparatuses have long been known. A common utilization of such apparatuses is a permanent installation in conjunction with water lines of a conventional home or business.

It has also been known to incorporate a water filter in conjunction with a supply container that is utilized within a home. Water is poured into a reservoir of the supply container with the water then seeping through a filter into a collection reservoir from where the water is dispensed as it is used.

The use of water bottles for individual use have also been known. A common form of such a water bottle is used by people engaged in sports such as bicyclists. The water bottle is filled with water and then consumed as desired as the person engages in the sport activity. Most of these water bottles are filled with conventional tap water. It is known that conventional tap water does include contaminants. It would be desirable to include some kind of a filtering apparatus in conjunction with such a water bottle that would permit the water to be filtered as it is consumed.

SUMMARY OF THE INVENTION

The structure of the present invention is directed to a water bottle which has a neck area within which is located an access opening. The access opening provides access into the internal chamber of the water bottle which functions as a storage chamber for a quantity of water. Within this access opening is removably mounted a filtering apparatus. The filtering apparatus has a head section which is supported within the access opening with the filter housing extending partially into the internal chamber of the water bottle. The head section includes a finger access chamber which permits engagement of a finger of a human to facilitate the removal of the apparatus which is snugly mounted within the access opening of the bottle. This removal is necessary to refill the bottle and replace the filtering apparatus. The filtering apparatus includes two separate filtering chambers with there being a central chamber and an outer chamber. The outer chamber is annular and is located exteriorly of the central chamber. The water is to flow through the outer chamber from the internal chamber of the bottle in the direction toward the bottom of the bottle and then enter the central chamber and flow in an opposite direction to be dispensed through a dispensing opening connected with the central chamber. Normally the filtering media within the central chamber will be of a different type than the filtering media within the outer chamber. Incorporated within the bottle is an air valve to permit entry of air into the bottle as water is removed from the bottle.

The primary objective of the present invention is to incorporate a water filter in conjunction with an individually consuming water bottle which is normally used in environments away from home or business.

Another objective of the present invention is to construct a water filtering bottle which can be constructed inexpensively and therefore sold to the ultimate consumer at a reasonable price.

BRIEF DESCRIPTION OF THE DRAWING

FIG. 1 is an exterior side elevational view showing the exterior of a typical water bottle which includes the water filtering apparatus of this invention;

FIG. 2 is a transverse, cross-sectional view taken along line 2—2 of FIG. 1 through the water filtering apparatus included within the water bottle of FIG. 1; and FIG. 3 is a longitudinal, cross-sectional view through the water filtering apparatus and water bottle taken along line 3—3 of FIG. 1.

DETAILED DESCRIPTION OF THE SHOWN EMBODIMENT

Referring particularly to the drawing there is shown a water bottle 10 which includes a base 12 formed of a sheet material sidewall which terminates at the bottom end in a bottom 14. The upper end of the base 12 is formed into a smaller diametered section defined as a neck 16. The sidewall of base 12 encloses an enlarged internal chamber 18 with the neck 16 enclosing an access opening 20. Mounted within the bottom 14 is an air valve 22. The construction of the air valve is deemed to be conventional and forms no specific part of this invention. However, the air valve 22 will permit air to enter within the internal chamber 18 from the ambient as water 24 located within the internal chamber 18 is consumed. The air valve 22 is constructed to not permit leakage of water during the time that the water bottle 10 is not being used.

A water filtering apparatus 26 is utilized which includes a head section 28. The head section 28 includes an exterior cylindrical sidewall 30 which is snugly mounted within the upper portion 32 of the access opening 20. The head section 28 is also hollowed out internally forming a finger access chamber 34. An annular flange 36 covers a portion of the finger access opening 34 with there being an outer dispensing opening 38 formed within the confines of the flange 36. The tip of a finger of a human may be located in finger access chamber 34 and by applying sufficient force against annular flange 36 cause the filtering apparatus 26 to be removed. Removal and replacement will be necessary periodically when the medias 48 and 66 become inaffective.

Also connecting with the finger access chamber 34 is a dispensing opening 40. Located internally of the dispensing opening 40 is a central chamber 42. Adjacent to the dispensing opening 40 and mounted within the central chamber 42 is a stainless steel screen. Mounted against the inside surface of the screen 44 is a pad 46. The pad 46 is to be porous and can be constructed of a sponge, fiber, fabric such as felt, or could comprise another form of screening. The function of the pad 46 and the screen 44 is to permit the passage of water readily there through, blocking additional contaminants, but not permit the passage of the media 48 that is contained within the central chamber 42.

The central chamber 42 is formed by an enclosing circular sidewall 50. This sidewall 50 is fixedly secured at its lower end to a bottom wall 52. Directly adjacent the bottom wall 52 and formed within the sidewall 50 are a plurality of outlet openings 54. The outlet openings 54 can comprise a plurality of holes or can comprise a plurality of slots. Mounted within the central chamber 52 against the outlet openings 54 is a pad 56 with this pad 56 again being constructed similar to the pad 46. Again the pad 56 functions to contain the media 48 within the central chamber 52 and not permit any of this media from coming into direct contact with the outlet openings 54 through which the media 48 would pass.

Surrounding the sidewall 50 is an outer chamber 58. This outer chamber 58 is annular and is enclosed by an exterior sidewall 60. This exterior sidewall 60 is also fixedly secured to the bottom wall 52. The upper edge of the exterior sidewall 60 is fixedly secured to the head section 28.

Formed through the exterior sidewall 60 directly adjacent the head section 28 are a plurality of inlet openings 62. Again the inlet openings 62 can comprise holes or a series of slots. These inlet openings 62 connect the area of the access opening 20 to the outer chamber 58. Mounted directly against the inlet openings 62 and located within the outer chamber 58 is a pad 64 which is formed in a ring shape. The pad 64 is again constructed similar to the pad 46. It is the function of the pad 64 to prevent the media 66 that fills the outer chamber 58 from being dislodged through the inlet openings 62.

The neck 16 of the bottle 10 includes an inwardly extending flange 68 located between the upper section 32 and the access opening 20. The head section 28 is to have a sealing washer 70 which is to rest in water-tight contact with the flange 68. The bottle 10 includes a cap 72 which is securable over the head section 28 closing such to the ambient. Movement of the cap 72 to the open position is accomplished by means of a manually engageable protuberance 74. The cap 72 is connected to the neck 16 by means of a plastic strip hinge 76.

It has been found in order to achieve maximum removal of contaminants that the media 66 can comprise one cubic inch particles constructed from dedusted coconut shell granulated activated carbon. Media 48 can comprise two cubic inch particles of acid washed, coal based granulated activated carbon. However, it is considered to be within the scope of this invention that the medias 48 and 66 could be the same or could be different other than what is mentioned. It is important that whatever medias are used that the maximum amount of contaminants are removed and the water that is then consumed not only has the minimum amount of contaminants but also has not picked up any of the granulated activated carbon that would be then consumed by the user. It is to be understood that the combination of the medias 40 and 66 removes approximately 50 to 99% of pesticides, chlorine, particulate matter (mud), algae, bacteria, and heavy metals. In addition the medias 48 and 66 are bacteriostatic. The medias 48 and 66 are also able to substantially eliminate turbidity which comprises suspended dirt. The overall effect of the medias 48 and 66 is to significantly improve odor and taste of the water.

The flow of water is as follows: When the user has removed the cap 72, the user then turns the bottle 10 upside down. This causes the water 24 to flow in the direction of arrows 78 into the water inlet openings 62 and through the pad 64 into the outer chamber 58. This water passes through the media 66 as is represented by arrows 80. After the water has flowed through the media 66, this water is then conducted as represented by arrows 82 into the outlet openings 54 and through the pad 56 in conjunction with the media 48. The water then flows in the direction of arrows 84 and through the pad 46 and screen 44 through the dispensing opening 40 and into the finger access chamber 34. It is to be noted that the direction of flow of the arrows 80 is opposite the direction of the flow of arrows 84. This maximizes the distance of flow of the water through the filtering apparatus 26 so as to maximize the removing of the contaminants. From the finger access chamber 34 the water flows through the dispensing opening 38 into the mouth of the user (not shown).

What is claimed is:

1. A water filtering bottle comprising:

said bottle having an internal chamber adapted to receive a quantity of water, said bottle having a smaller diametered upper end section defining a neck providing an access opening to said internal chamber;

a water filtering apparatus mounted within said access opening, said water filtering apparatus having a central chamber and an outer chamber, said outer chamber being located exteriorly of said central chamber, a water inlet opening connecting said outer chamber to said internal chamber, a water outlet opening connecting said outer chamber with said central chamber, a dispensing opening connecting with said central chamber, water flows from said internal chamber through said inlet opening and into said outer chamber and then through said outlet opening into said central chamber and then through said dispensing opening into the ambient, the direction of water flow through said outer chamber being opposite to the direction of flow through said central chamber;

a first filter media located within said central chamber; and a second filter media located within said outer chamber.

2. The water filtering bottle as defined in claim 1 wherein:

said water filtering apparatus being removably mounted within said access opening.

3. The water filtering bottle as defined in claim 2 wherein:

said water filtering apparatus having a head section, said head section being mounted in said access opening, said head section including a finger access chamber permitting entry of the tip of a finger of a human facilitating applying of force resulting in removal of said water filtering apparatus.

4. The water filtering bottle as defined in claim 1 including:

said bottle having an air valve, said air valve permitting entry of air into said internal chamber as water is dispensed from said internal chamber.

5. The water filtering bottle as defined in claim 1 wherein:

said water filtering apparatus including a head section, said head section being mounted within said access opening, said water inlet opening being located adjacent said head section.

6. The water filtering bottle as defined in claim 5 wherein:

said water filtering apparatus having a bottom wall, said bottom wall being spaced furthest from said head section, said water outlet opening being located directly adjacent said bottom wall.

7. The water filtering bottle as defined in claim 1 wherein:

said first filter media being different from said second filter media, both said first filter media and said second filter media including a mass of particles, said particles of said first filter media being larger in size than said particles of said second filter media.

8. The water filtering bottle as defined in claim 1 wherein:

said central chamber including first barrier means located at both said water outlet opening and at said dispensing opening, said first barrier means preventing removal of said first filter media from said central chamber.

9. The water filtering bottle as defined in claim 8 wherein:

second barrier means included within said outer chamber, said second barrier means being located at said water inlet opening, said second barrier means preventing removal of said second filter media from said outer chamber.

* * * * *